(12) United States Patent
Jacobsen et al.

(10) Patent No.: US 8,849,457 B2
(45) Date of Patent: Sep. 30, 2014

(54) CONTACT DISPLACEMENT ACTUATOR SYSTEM

(75) Inventors: Stephen C. Jacobsen, Salt Lake City, UT (US); Marc X. Olivier, Sandy, UT (US)

(73) Assignee: Raytheon Company, Waltham, MA (US)

( * ) Notice: Subject to any disclaimer, the term of this patent is extended or adjusted under 35 U.S.C. 154(b) by 1024 days.

(21) Appl. No.: 11/879,448

(22) Filed: Jul. 16, 2007

(65) Prior Publication Data

US 2009/0210093 A1 Aug. 20, 2009

Related U.S. Application Data

(60) Provisional application No. 60/831,476, filed on Jul. 17, 2006.

(51) Int. Cl.
- *A61F 2/48* (2006.01)
- *A61H 3/00* (2006.01)
- *B25J 9/00* (2006.01)
- *A61H 1/02* (2006.01)

(52) U.S. Cl.
CPC ......... *B25J 9/0006* (2013.01); *A61H 2201/164* (2013.01); *A61H 3/00* (2013.01); *A61H 2201/0176* (2013.01); *A61H 2201/5069* (2013.01); *A61H 2201/0173* (2013.01); *A61H 2201/5079* (2013.01); *A61H 2201/1238* (2013.01); *A61H 2201/5007* (2013.01); *A61H 2201/1676* (2013.01); *A61H 2201/1616* (2013.01); *A61H 2201/165* (2013.01); *A61H 2201/163* (2013.01); *A61H 1/024* (2013.01); *A61H 1/0244* (2013.01); *A61H 2201/1642* (2013.01); *A61H 3/008* (2013.01); *A61H 2201/5061* (2013.01); *A61H 1/0255* (2013.01)
USPC ............... 700/260; 623/24; 623/26; 700/261; 700/262; 700/263

(58) Field of Classification Search
USPC .............. 123/46 R; 60/39.182; 600/587, 595; 601/5, 16; 604/95.01; 607/48, 49; 700/245, 253, 254, 257, 258, 260, 261, 700/262, 263; 703/6; 73/865.4; 623/24, 26, 623/27, 28, 29, 30–65
See application file for complete search history.

(56) References Cited

U.S. PATENT DOCUMENTS 3,358,678 A * 12/1967 Kultsar .......................... 601/23
3,449,769 A * 6/1969 Mizen ............................. 623/26

(Continued)

FOREIGN PATENT DOCUMENTS

DE 10 2004 029513 9/2005
EP 1721593 A1 11/2006

(Continued)

OTHER PUBLICATIONS

Jacobsen, S.C. "Research Robots for Application in AI, Teleoperation and Entertainment," Proceedings of the International Fluid Power Exposition and Technical Conference, Mar. 24-24, 1992, pp. 1-19, Chicago, Illinois.

(Continued)

*Primary Examiner* — Stephen Holwerda
(74) *Attorney, Agent, or Firm* — Thorpe North & Western LLP

(57) ABSTRACT

A robot displacement device for use with a robotic frame shaped to approximate and be coupleable to at least a portion of the human body and configured to mimic movement of the human body. The device employs a plurality of force sensors which are attached to the robotic frame which detect a baseline controlling interface force status relationship between the sensors and the extremities of the human operator. Based on the output force signal from the sensors and the force and direction of gravity relative to the robotic frame, the computation system calculates at least a rotational force required to maintain the controlling force status relationship. That system then generates and transmits an actuation signal to a drive system attached to the robotic frame which displaces a portion of the robotic frame in order to maintain the controlling force status relationship.

9 Claims, 11 Drawing Sheets

(56) References Cited

U.S. PATENT DOCUMENTS

| | | | |
|---|---|---|---|
| 3,535,711 A * | 10/1970 | Fick | 623/26 |
| 5,101,472 A * | 3/1992 | Repperger | 700/261 |
| 5,117,814 A * | 6/1992 | Luttrell et al. | 601/33 |
| 5,282,460 A * | 2/1994 | Boldt | 601/5 |
| 5,516,249 A | 5/1996 | Brimhall | |
| 5,865,770 A * | 2/1999 | Schectman | 601/23 |
| 5,961,476 A * | 10/1999 | Betto et al. | 602/16 |
| 6,016,385 A | 1/2000 | Yee et al. | |
| 2003/0005896 A1* | 1/2003 | Jacobsen et al. | 123/78 AA |
| 2003/0223844 A1 | 12/2003 | Schiele et al. | |
| 2004/0102723 A1* | 5/2004 | Horst | 601/5 |
| 2004/0106881 A1 | 6/2004 | McBean et al. | |
| 2004/0116836 A1* | 6/2004 | Kawai et al. | 600/595 |
| 2004/0246769 A1* | 12/2004 | Ido | 365/154 |
| 2005/0059908 A1* | 3/2005 | Bogert | 601/5 |
| 2005/0166413 A1 | 8/2005 | Crampton | |
| 2006/0052732 A1 | 3/2006 | Shimada et al. | |
| 2006/0130594 A1 | 6/2006 | Ikeuchi | |
| 2007/0054777 A1 | 3/2007 | Masakazu et al. | |

FOREIGN PATENT DOCUMENTS

| | | |
|---|---|---|
| JP | H08-126984 A | 5/1996 |
| JP | H1156931 | 3/1999 |
| JP | 2004/105261 | 4/2004 |
| JP | 2005-237504 A | 9/2005 |
| JP | 2006-167223 A | 6/2006 |
| WO | WO 2003/002309 | 1/2003 |

OTHER PUBLICATIONS

Ostling, Erik, "Wearable Robots," Technology Review, Jul./Aug. 2004, pp. 70-74.

Farhad Aghili et al., "Sensing the torque in a robot's joints," Mechanical Engineering, www.memagazine.org/backissues/september98/features/torque/torque.html, 1998, pp. 1-9, The American Society of Mechanical Engineers.

"Load Cell Designs," www.omega.com/literature/transactions/volume3/load3.html, Nov. 1, 2005, 3 pages.

"Degrees of Freedom," Robotics Research Group, www.robotics.utexas.edu/rrg/learn_more/low_ed/dof/ University of Texas, Oct. 25, 2006, pp. 1-2.

Kim Gab-Soon, "Development of a small 6-axis force/moment sensor for robot's fingers," Measurement Science and Technology, Sep. 30, 2004, pp. 1-2, Issue 11.

Berkeley lower extremity exoskeleton (BLEEX), 3 pages.

"Foot Force-Torque Sensor," "Novel sensor for measuring forces and torques at the foot," Oak Ridge National Laboratory, 1 page.

Pin, Francois, "Wearable Robotics" Presented to New Horizons in Science Briefing, Oct. 2003, 19 pages, Knoxville, Tennessee.

Jansen, John, et al. "Exoskeleton for Soldier Enhancement Systems Feasibility Study" Oak Ridge National Laboratory, Sep. 2000, 44 pages., Oak Ridge, Tennessee.

* cited by examiner

US 8,849,457 B2

CONTACT DISPLACEMENT ACTUATOR SYSTEM

The present application claims priority to U.S. Provisional Patent Application 60/831,476, filed on Jul. 17, 2006, which is incorporated herein by reference in its entirety for all purposes.

SUMMARY OF THE INVENTION

It has been recognized that it would be advantageous to develop a wearable exoskeleton robot displacement system that approximates the shape of the human body and is capable of mirroring human movement displacing multiple limbs of the exoskeleton frame concurrently and in real time via direct contact by the human operator without relying on predefined trajectory movements of the operator.

The invention provides a robot displacement device for use with a robotic frame shaped to approximate and be coupleable to at least a portion of the human body and configured to mimic movement with the human body. Said robotic frame is also referred to herein as an exoskeleton. To accomplish this movement, the device employs a plurality of linear and rotational force sensors which are attached to the robotic frame near the hands and feet of the frame. The sensors detect a baseline controlling interface force status relationship between the sensors and the extremities of the human operator, including a contacting relationship as well as a displaced, non-contacting relationship. The sensors then output a force signal to a computation system which is integrated into the robotic frame. Based on the output force signal from the sensors and the force and direction of gravity relative to the robotic frame, the computation system calculates a linear and rotational force required to maintain the controlling force status relationship. That system then generates and transmits an actuation signal to a drive system attached to the robotic frame. The drive system then displaces a portion of the robotic frame in order to maintain the controlling force status relationship. Alternatively, where no displacement is desired, but the load on the robotic frame has changed, the drive system increases the linear and rotational forces on the robotic frame as needed to maintain the controlling force status relationship.

Additional features and advantages of the invention will be apparent from the detailed description which follows, taken in conjunction with the accompanying drawings, which together illustrate, by way of example, features of the invention.

DETAILED DESCRIPTION

Figure 1A:
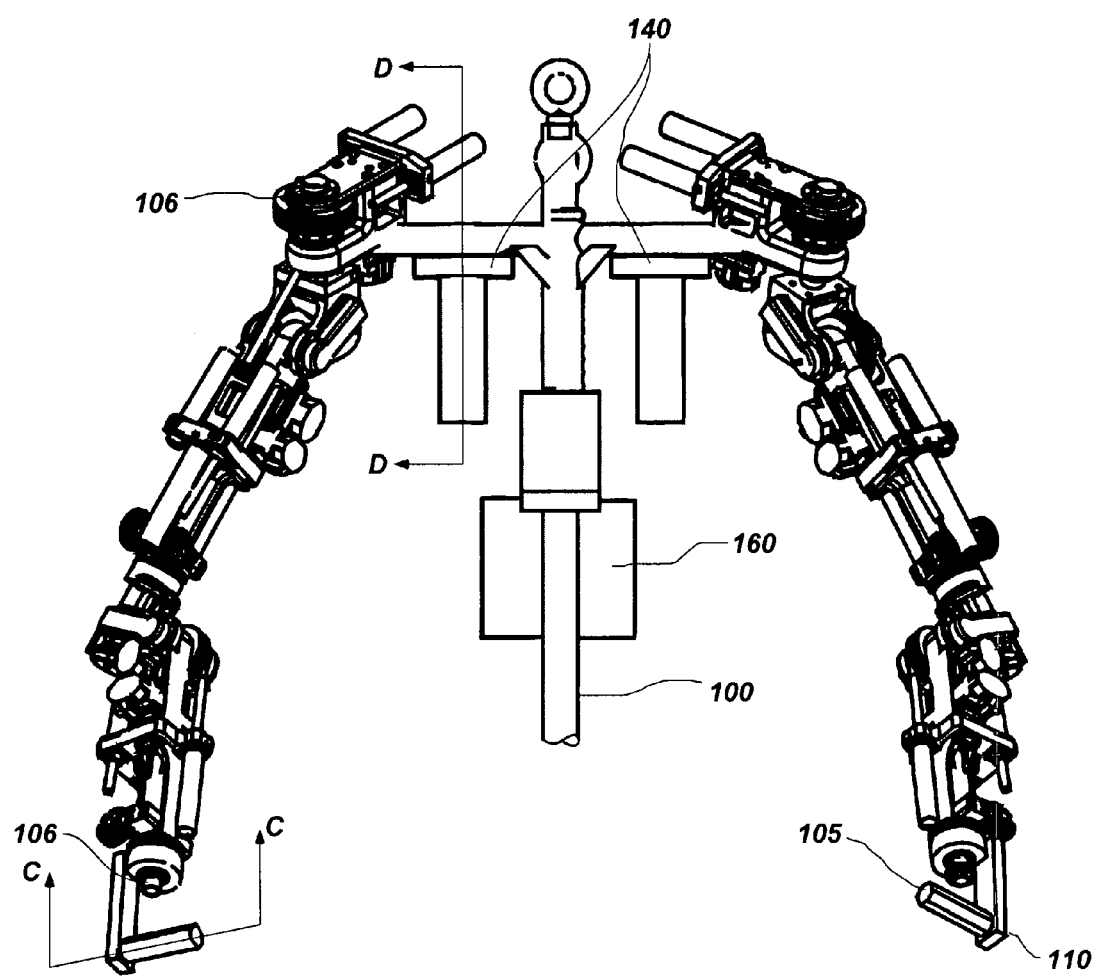
FIG. 1A is a front view of one embodiment of a top portion of a robotic frame, central control unit, force sensors, and drive system showing cross-sections displayed in the proceeding figures.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention relates generally to wearable robotic displacement systems. More particularly, the present invention relates to a robotic frame and actuator system that mechanically displaces in proportion to force applied by a user therewith.

Integrating humans and robotic machines in one system offers a world of opportunities for creating a new generation of assistance technology that can be used in biomedical, industrial, military, and aerospace applications. The human component contributes its natural and highly developed control algorithms that implement advanced decision making and sensing mechanisms, while the robotic component offers technological advantages such as power, accuracy and speed.

An exoskeleton driven by a power source other than the human operator is a class of robot manipulators that amplifies human muscle strength while maintaining human control of the operator's objective. The joint system of the exoskeleton should approximate that of the human body and ideally respond to both the amplitude and direction of force of the human operator through some type of human/exoskeleton interface.

Actual efforts to make motorized exoskeletons date back to the 1960s, although design studies apparently began well before. Former projects resulted in designs for self-standing exoskeletons powered by hydraulics and electricity which came to life as hulking contraptions. The robots, as heavy as cars, allegedly would have enabled a person to lift a refrigerator as though it were a bag of potatoes. However, attempts to operate multiple limbs at once would lead to violent and uncontrollable motion. Since then, most development has focused on components for exoskeletons rather than complete systems.

A portion of the robotic exoskeleton research effort has been focused on developing the human/exoskeleton interface through at bioport at the neuromuscular level using electromyography signals as the primary command signal to the system. Such systems use bioelectric sensors attached to the skin on the legs to monitor signals transmitted from the brain to the muscles. When an individual intends to stand or walk, the nerve signal from the brain to the muscles generates a detectable electric current on the skin's surface. These currents are picked up by the sensors and sent to a computer that translates the nerve signals into signals that control electric motors at the hips and knees of the exoskeleton. However, when operating under extreme conditions wherein the human operator is perspiring, running, jumping, and/or laying down, the accuracy of the bioelectric sensors can decrease significantly.

Additional research efforts have focused on control of the exoskeleton using the concept of direct contact by the human operator at the human/exoskeleton interface. Many schemes attempting to implement this concept used trajectory tracking methods which relied on deriving and solving the dynamic equations of motion. The solutions to those equations are then used to determine a desired trajectory of the exoskeleton required to mirror movement of the human operator. High gain position controllers, often employing adaptive elements, are used to follow the predefined trajectory of the operator. The trajectory tracking methods have two primary drawbacks. First they are computationally intensive. Second, the method is not robust to disturbances or changes in the environment. If the exoskeleton comes into contact with an object or its environment or load changes, the dynamics and trajectory must be recalculated or it will fall over.

Referring generally to FIGS. 1A-2B, the exoskeleton frame 100 is shaped to approximate and be coupleable to at least a portion of the human body and configured to mimic movement with the human body. To accomplish this movement, the device employs a plurality of force sensors which are attached to the robotic frame 100 near the hands 110 and feet 120 of the frame which are operatively coupled to a central control system 160 and drive system 150. The force sensors are capable of detecting linear or rotational forces acting on the robotic frame 100. In one aspect of the invention, the sensitivity of the force sensors is adjustable. For example, the sensors can be configurable to respond only when a force is applied to the force sensor which exceeds a predetermined level.

As used herein, "interface force status relationship" (IFSR) relates to a preferred positional relationship of the exoskeleton component to its proximal human anatomy. In one embodiment of the present invention, for example, the wrist of the wearer may not be in forceful contact with the corresponding portion of the exoskeleton forearm/wrist when not moving. In this case the user needs to apply a force to the exoskeleton as movement is desired—raising an arm or pushing it to the side. This movement results in modification of the non-contacting status of the IFSR, to one of physical contact between the exoskeleton and wrist of the user. The exoskeleton will respond to this contact by an appropriate movement to "get out of the way." Such response may be sequentially repeated many times until the movement of the wrist/forearm is completed. At this point the force status relationship is again stable in the non-contacting position and movement is suspended.

In another embodiment, the foot of the user may be standing on sensors, resulting in a given applied force. This IFSR is based on actual contact between the foot and sensor. As the user raises the foot, a non-contacting relationship arises. The exoskeleton will then respond in an effort to reinstate the loaded contact between the foot and its associated exoskeleton component. In this case, therefore, the IFSR is the contacting relationship where the user's foot is forcefully contacting the exoskeleton.

The sensors are capable of detecting a baseline controlling interface force status relationship between the sensors and the extremities of the human operator. The sensors then output a force signal to a central control unit and computational system 160 which is integrated into the robotic frame 100. Based on the output force signal from the sensors and the force and a direction of gravity relative to the robotic frame 100, the computation system 160 calculates a linear and rotational force required to maintain the controlling force status relationship whether it is a contacting or non-contacting relationship. That system then generates and transmits an actuation signal to a drive system 150 attached to the robotic frame 100. The drive system 150 then displaces a portion of the robotic frame 100 in order to maintain the controlling force status relationship. Alternatively, where no displacement is desired, but the load on the robotic frame 100 has changed, the drive system 150 increases or decreases the linear and rotational forces on the robotic frame 100 as needed to maintain the controlling force status relationship until the movement is completed.

More generally, the present invention allows the wearer to perform activities that he would normally be incapable of or would otherwise have to expend considerable time and energy to perform. The system may be worn by military personnel, construction workers, police, medical personnel, and others to support the function or correct the shape of the human body. The wearable frame could reduce the number of personnel required in dangerous or hazardous tasks and reduce the physical stress experienced by personnel when executing such tasks. The wearable frame could also be configured for application-specific tasks which might involve exposure to radiation, gas, chemical or biological agents. The wearable frame could also be used to aid physically impaired individuals in executing otherwise impossible tasks such as sitting, standing or walking. The displacement device could serve as a power amplifier, amplifying small motions and forces into controlled, large motions and forces. By strategically placing sensors and control devices in various locations on the frame, individuals who are only capable of applying very small amounts of force could control the motion of the frame. Additionally, physically impaired individuals could be given freedom of movement without being tethered to a power source. Safety devices such as power interrupts could be built into the system to prevent unintentional movement of the frame and any damage to the individual wearing the frame. Subject matter related to exemplary embodiments of the present invention may be found in U.S. Pat. Nos. 6,957,631 and 7,066,116 and U.S. patent application Ser. Nos. 11/292,908, 11/293,413, 60/904,245, 60/904,246, and 11/293,726; each patent and/or patent application being incorporated herein in their entireties by reference.

Figure 1B:
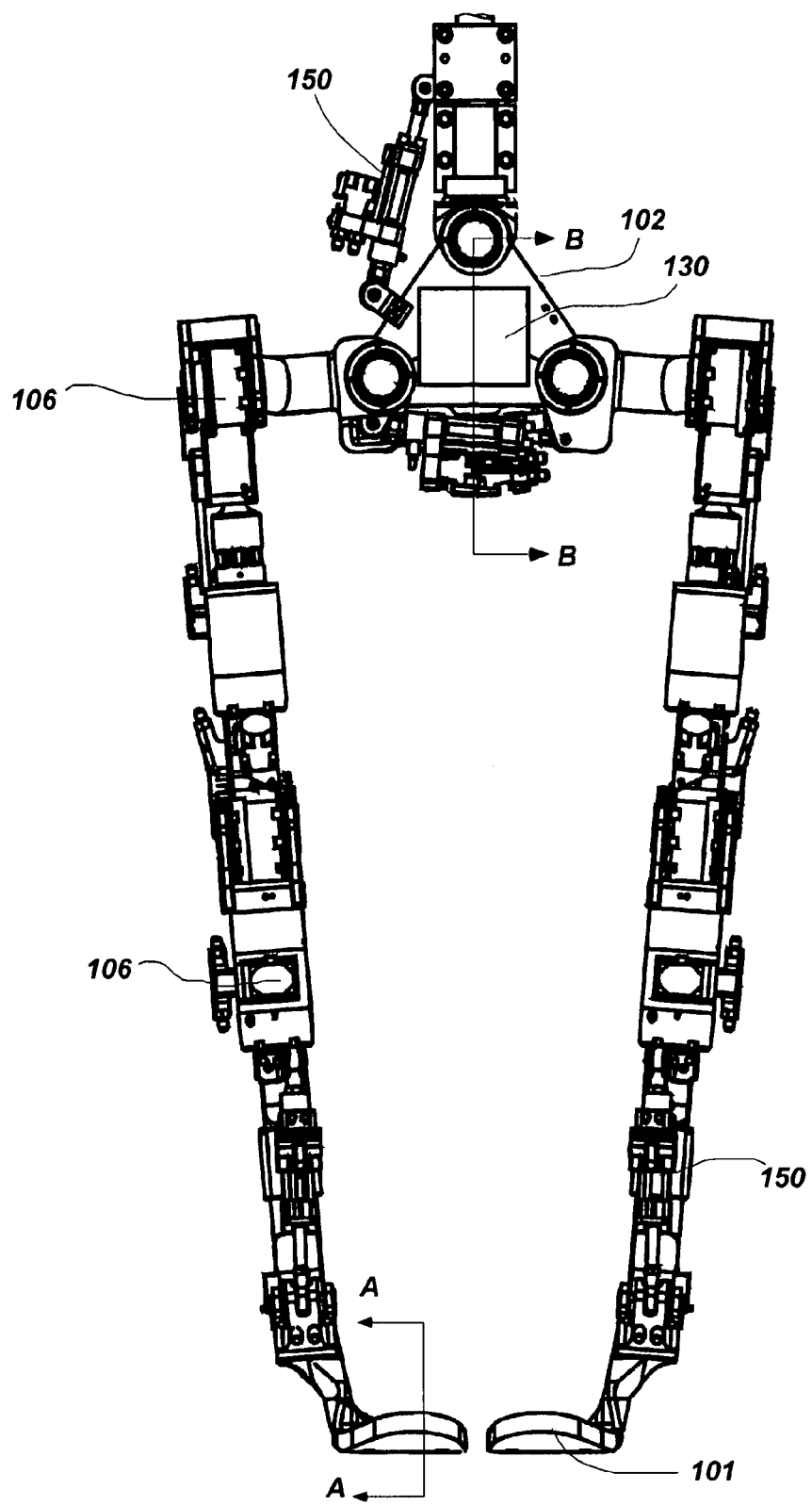
FIG. 1B is a front view of one embodiment of a bottom portion of a robotic frame, force sensors, and drive system showing cross-sections displayed in the proceeding figures.
Figure 2A:
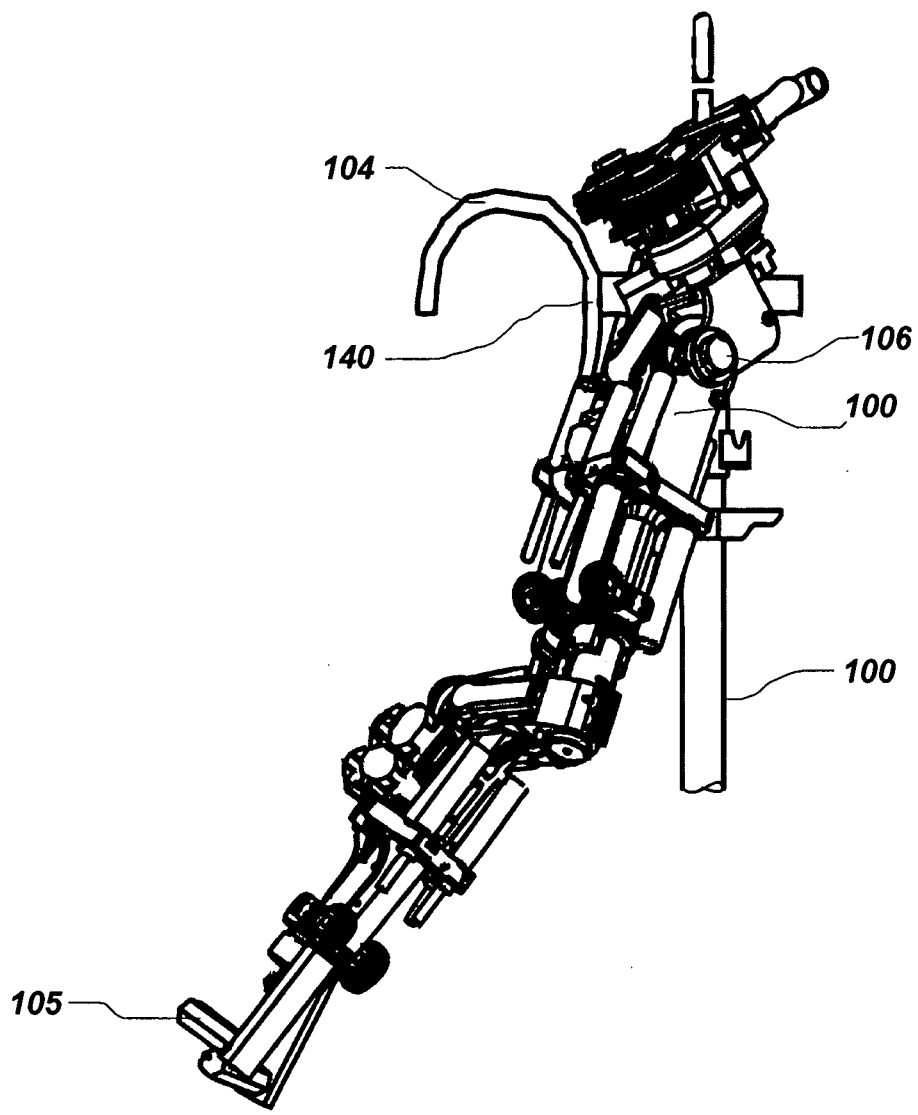
FIG. 2A is a side view of the robotic frame of FIG. 1A.
Figure 2B:
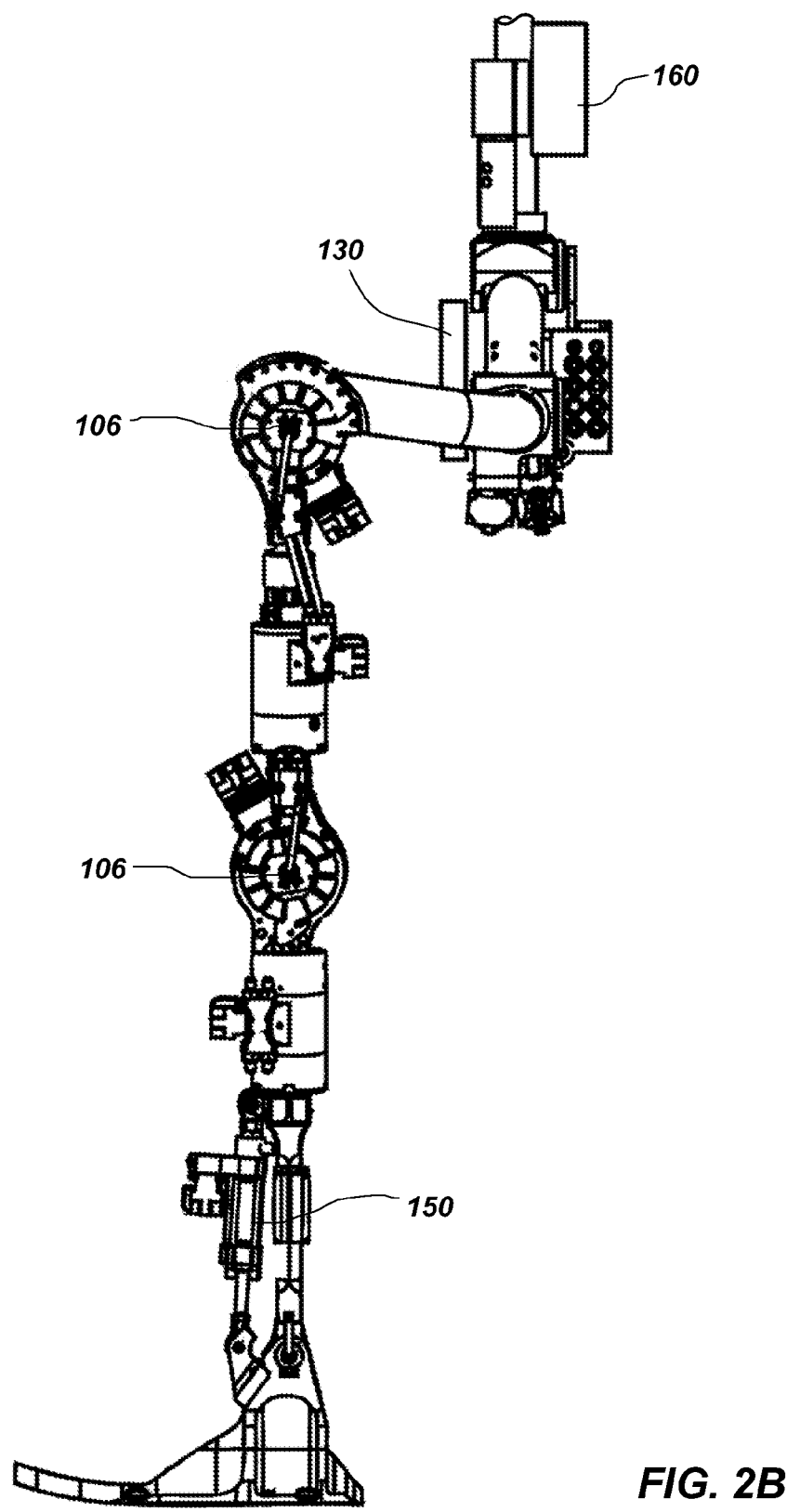
FIG. 2B is a side view of the robotic frame of FIG. 1B.
Figure 3:
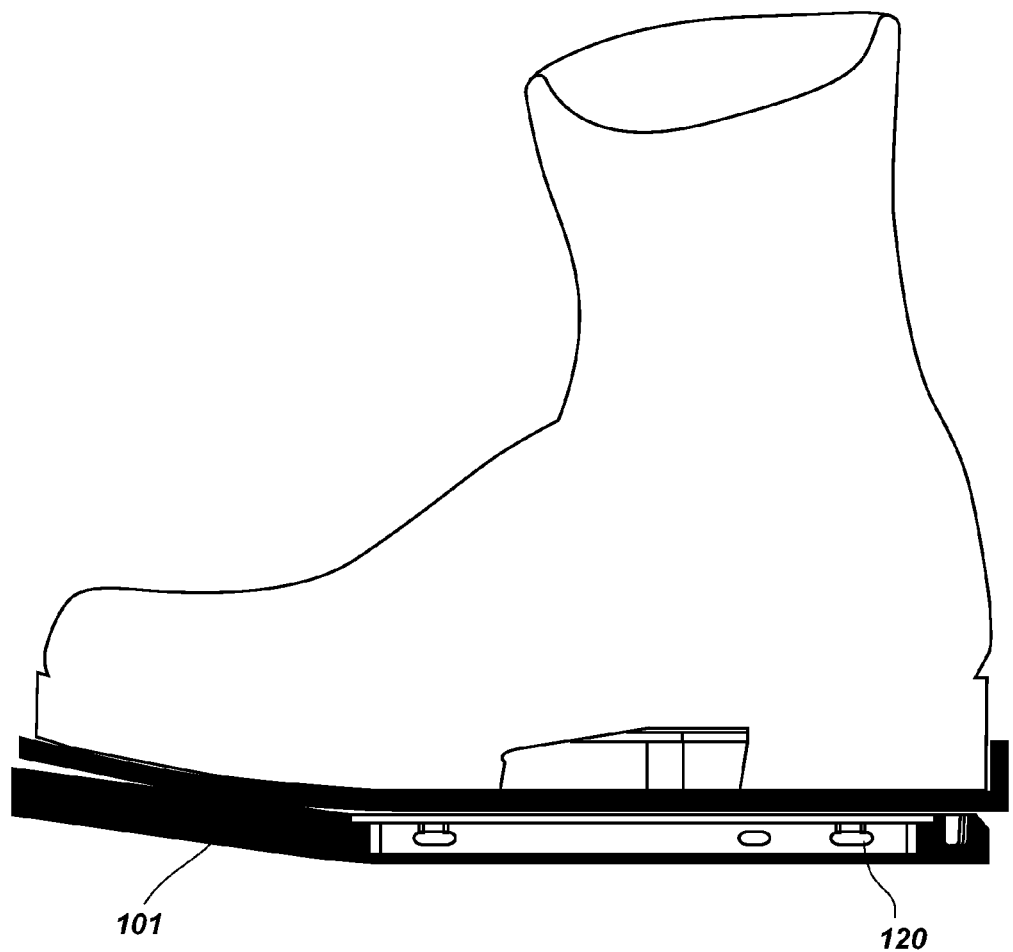
FIG. 3 shows cross section A-A of FIG. 1 illustrating one embodiment of a foot portion of the robotic frame and related force sensors.
Figure 4:
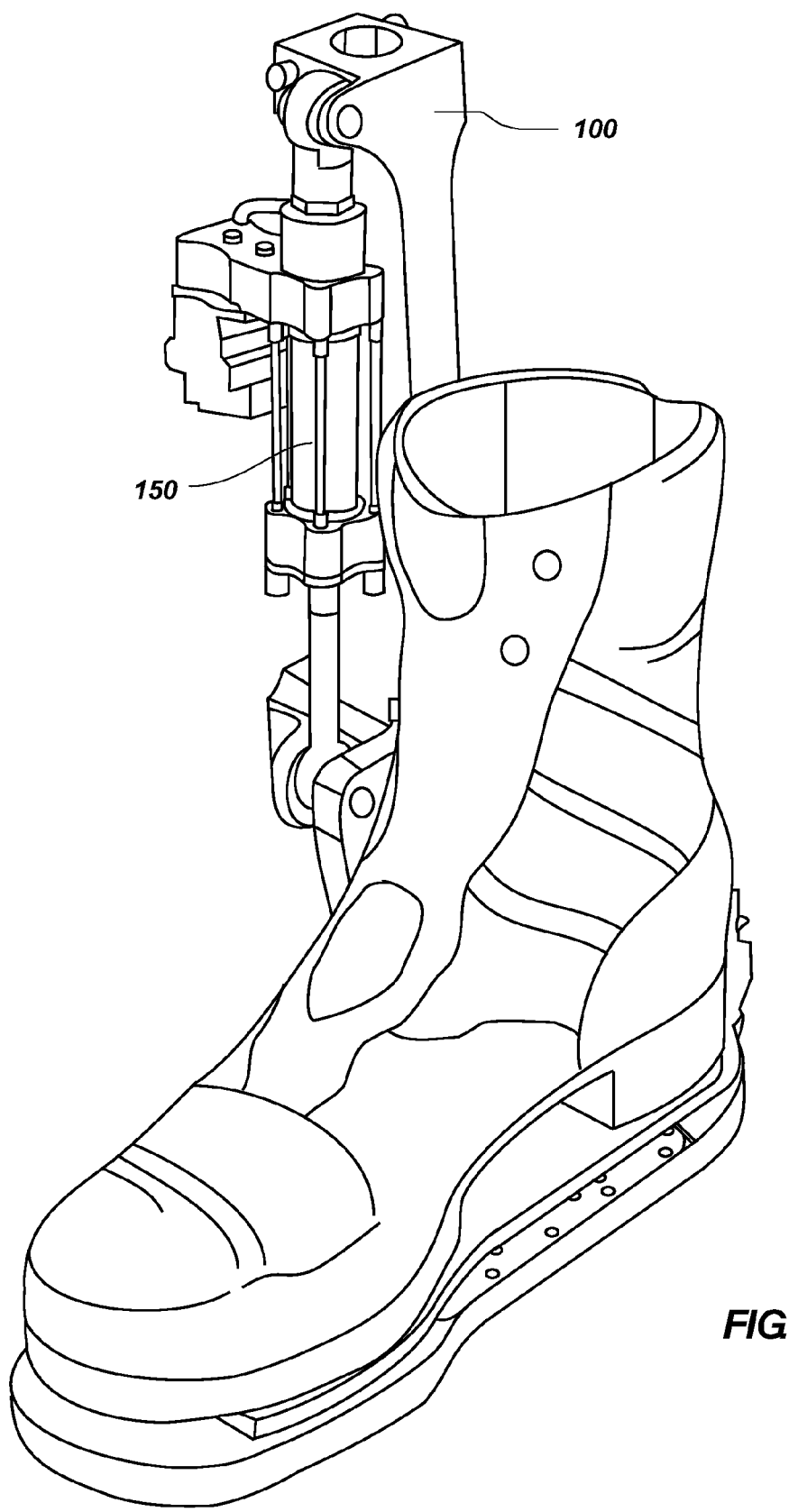
FIG. 4 is a perspective view of one embodiment of a foot portion of a robotic frame.
Figure 5:
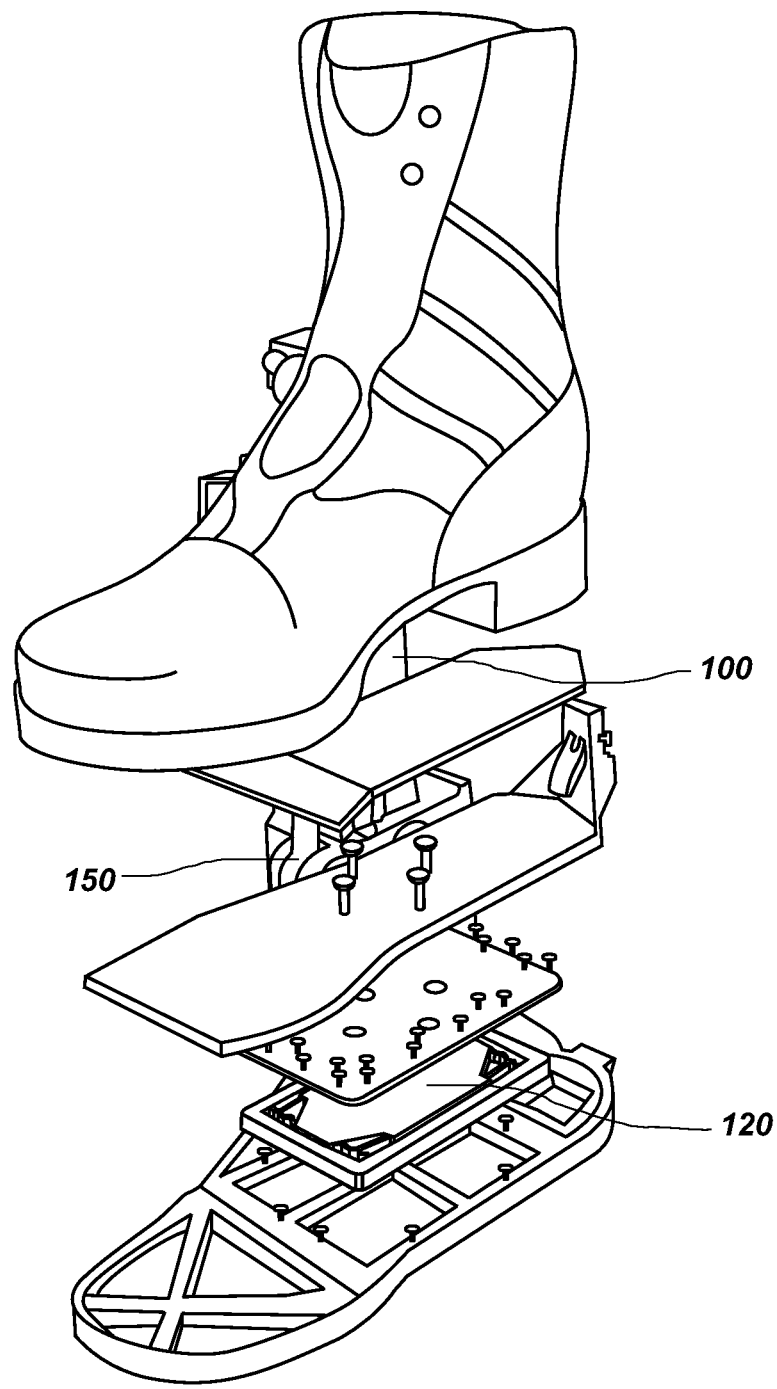
FIG. 5 is an exploded perspective view of one embodiment of a foot portion of a robotic frame.
Figure 6:
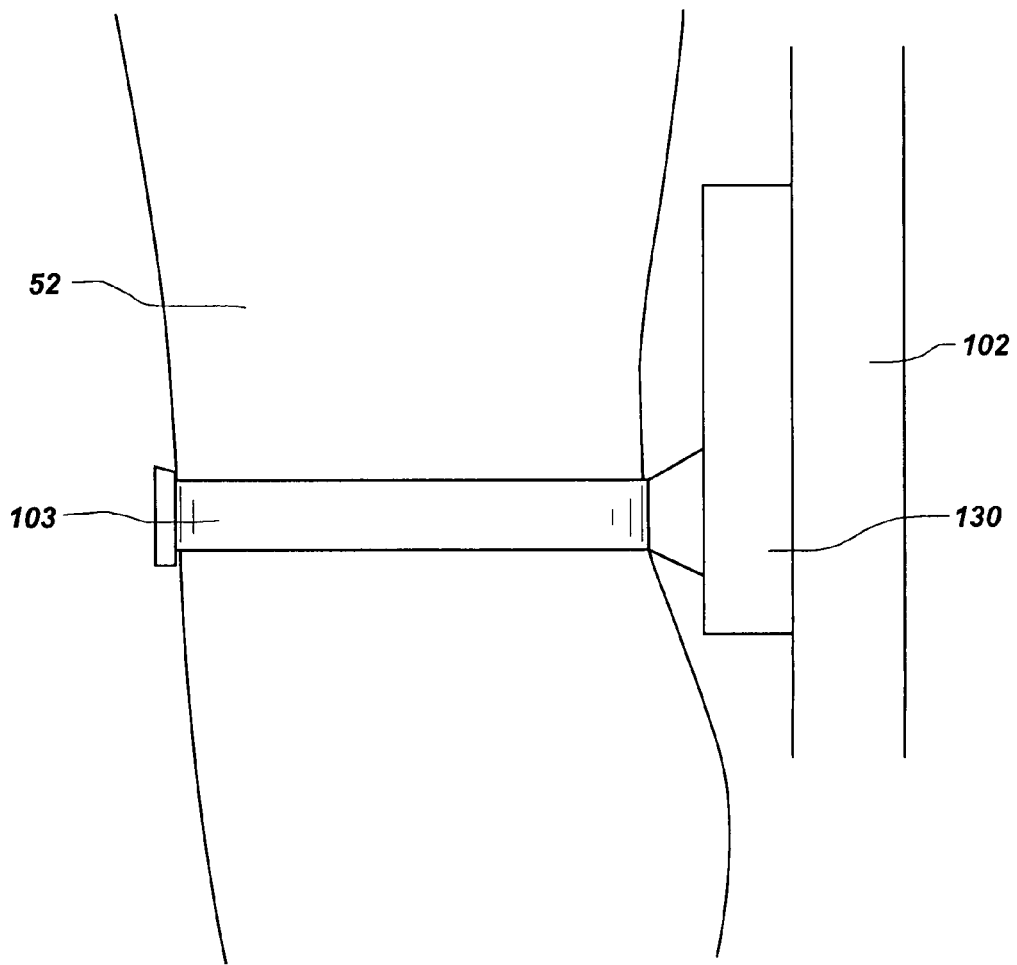
FIG. 6 is cross section B-B of FIG. 1 showing one embodiment of a cross section of a hip portion of a robotic frame and related force sensors.
Figure 7:
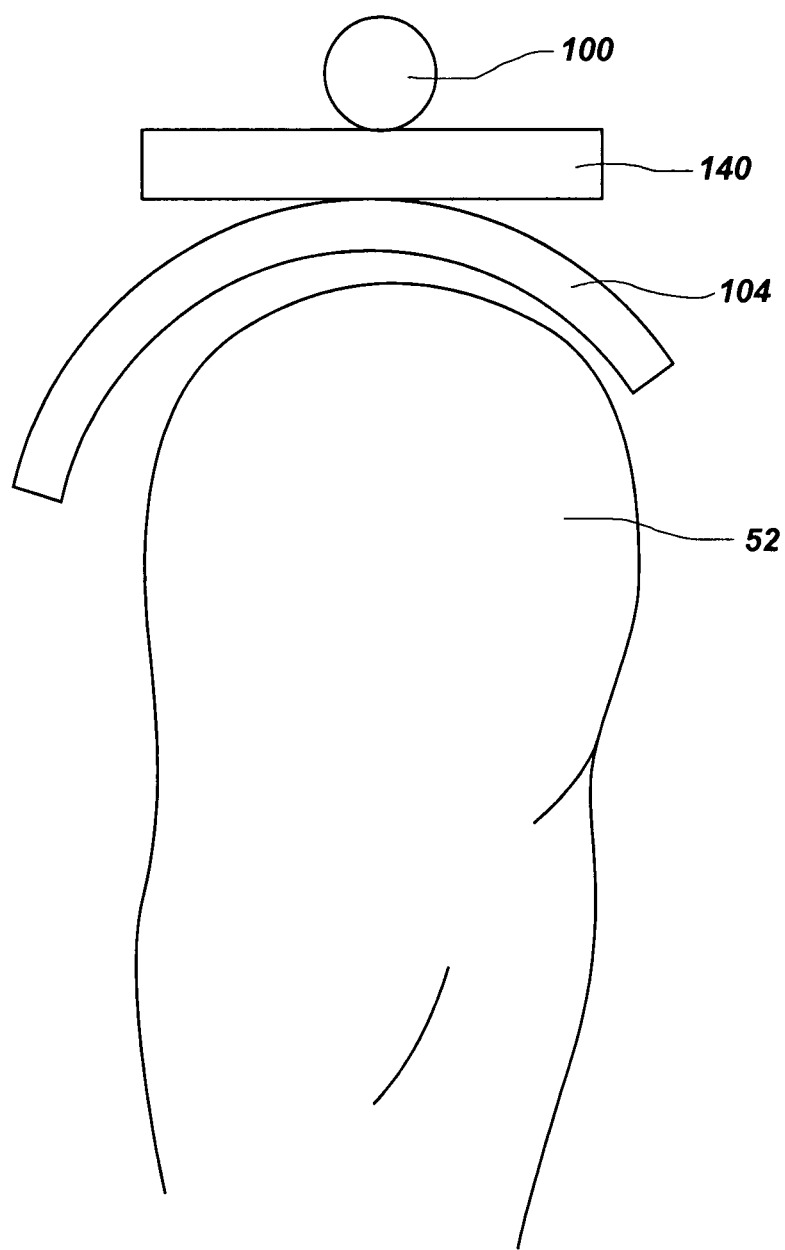
FIG. 7 is cross section C-C of FIG. 1 showing one embodiment of a cross section of a shoulder portion of a robotic frame and related force sensors.
Figure 8:
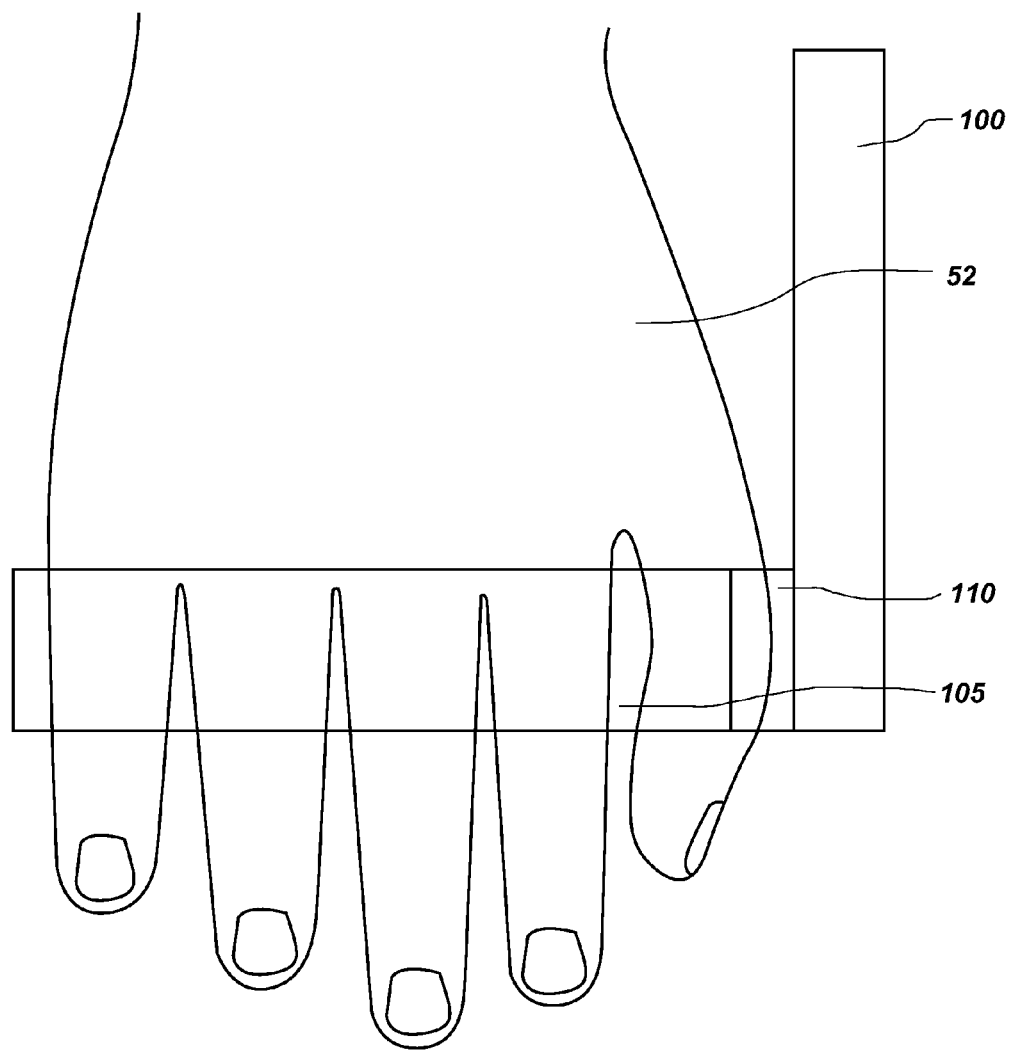
FIG. 8 is cross section D-D of FIG. 1 showing one embodiment of a cross section of a hand portion of a robotic frame and related force sensors.

In accordance with a more detailed aspect of the present invention, FIGS. 1A and 1B illustrate a system including a robot displacement device utilizing a plurality of sensors which are attached to a robotic frame 100 and disposed adjacent to or in contact with the human operator near the hands 110 and feet 120. In another aspect, sensors are disposed adjacent to or in contact with the human operator near the hips 130 and shoulders 140. The sensors 110, 120, 130, and 140 are capable of simultaneously detecting multiple directions of movement of the human operator upon multiple axes. Referring generally to FIGS. 3 through 8, in one exemplary embodiment of the present invention, a human operator may enter the robot displacement device by placing his or her feet into a foot portion 101 of the robotic frame 100 wherein the feet of the operator are in contact with a corresponding force sensor 120. Portions of the human operator are also in contact with force sensors disposed on various locations of the robotic frame 100. For example, FIG. 6 shows the hip portion of the robotic frame 102 and corresponding force sensor 130. The operator 52 may be coupled to the frame 100 by a waist strap 103 or other appropriate coupling device. Shown in FIG. 7, the operator 52 is further coupled to the robotic frame 100 by a shoulder strap 104. In one aspect, the force sensor 140 is attached to the robotic frame 100 near the shoulder area of the operator. Further, as illustrated in FIG. 8, the hand of the operator 52 grips a handle 105 coupled to the robotic frame 100. The force sensor 110 is disposed between the handle 105 and the robotic frame 100. While reference is made herein to force sensors disposed at specific locations on the robotic frame 100, it is understood that the force sensors could be strategically placed at numerous locations at the robotic frame 100 in order to facilitate proper operation of the robotic displacement device.

In one aspect of the invention, concurrent with the measurement of operator force on the system, a central control unit 160 can detect the current joint position and velocity of the robotic frame as well as the force of gravity and direction of gravity relative to the position of the frame. Desired joint position and velocity values of the exoskeleton, responsive to operator movement, are then calculated. Thereafter, the drive system 150 of the device, which may include multiple drive mechanisms positioned at multiple locations on the robotic frame 100, acts in concert with movement of the operator to displace the robotic frame 100. In one exemplary embodiment, drive mechanisms may be disposed proximate to joints 106 of the robotic frame 100 and configured to create a linear or rotational force on a member of the robotic frame 100 in order to create the desired displacement. Based on the movement of the operator, the exoskeleton frame 100 may be displaced in multiple directions and upon multiple axes. The central control unit 160 can also serve as a fuel storage device, power generation center and/or a signal generation/processing center. Actual movement of the exoskeleton can be accomplished with delivery of hydraulic fluid through control valves to activate displacement of the robotic frame 100. While specific reference is made herein to hydraulic fluid actuator systems, it is understood that any actuator system capable of moving portions of the exoskeleton are contemplated for use herein.

In an additional embodiment, the central control unit 160 can calculate a force of the exoskeleton structure 100 exerted on the human operator and also a joint rotational force of the drive system 150 required to counteract the calculated force exerted on the human operator by the robotic frame 100. Thereafter, the drive system 150 exerts the computed rotational force on the joint component of the robotic frame 100 to counteract the force exerted on the human operator by the robotic structure 100. For example, an operator of the robotic frame 100 may have a load placed on the back of the robotic frame 100. That load may create a moment force on the robotic frame 100 which would otherwise pull the robotic frame 100 and the human operator down and/or backwards. In one embodiment of the invention, the central control unit 160 is configured to counteract forces placed externally on the robotic frame 100 in order to maintain the robotic frame 100 in an upright position. It is understood, however, that the central control system 160 may be configured to maintain the robotic frame 100 in any desired position (e.g., prone, crouching, and/or sitting).

In one aspect of the invention, the control unit 160 of the robot displacement device may be configured to direct power from or to groups of less than all of the force sensors. This would enable the device to essentially "shut down" certain portions of the robotic frame 100 in order to optimize the wearer's desired mode of operation. In yet another aspect of the invention, the control system 160 is further configured to receive remote signals from a communication device in order to facilitate automatic changes in the mode of operation from a remote observer. For example, a remote observer may send a control signal to the control system 160 commanding the robot displacement device to lay flat or to actuate itself (i.e., over-ride any command signals from the force sensors) thereby ambulating to a location designated by the remote observer or to a predetermined location.

Referring generally to FIGS. 1A and 1B, in one embodiment of the present invention, movement of the robotic frame 100 is accomplished by a drive system 150 disposed proximate to the joints 106 of the robotic frame having, among other things, hydraulic lines and valves. The cylinder (not shown) within the drive system 150 can be extended or retracted to adjust the relative position of the robotic frame. The hydraulic fluid line and drive mechanism can be pressurized or driven by an internal combustion (IC) engine or other power conversion device. One example of a power conversion device includes an engine with a chamber having a primary piston, a rapid response component and a controller operably interconnected to the chamber. The chamber can also include at least one fluid port for supplying fluid thereto and an out-take port. The primary piston in combination with the fluid port can be configured to provide a variable pressure to the chamber and at least partially facilitate combustion to create energy in a combustion portion of the chamber. The primary piston can be configured to reciprocate in the chamber. The controller can be configured to control the combustion in the chamber. The rapid response component can be in fluid communication with the chamber so that the rapid response component is situated adjacent the combustion portion of the chamber. The system can be configured such that a drive system 150 and a power conversion device 180 are located at each joint of the robotic frame 100 and are controlled by signals from the central control unit 130. Also, safety devices such as power interrupts can be included to protect the safety of the personnel wearing the robotic frame.

Figure 9:
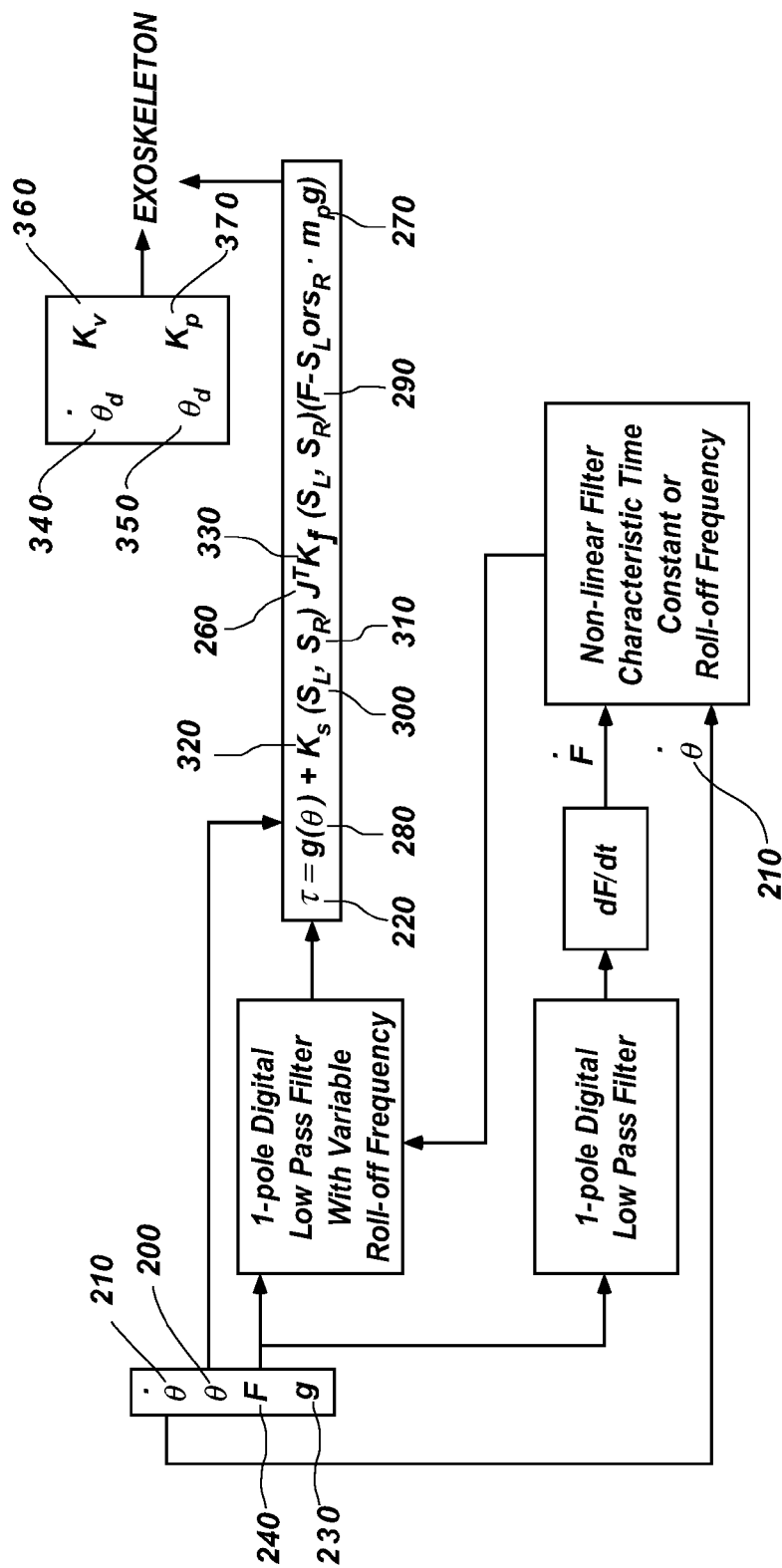
FIG. 9 is a block diagram illustrating of one embodiment of an exoskeleton control system.

In another exemplary embodiment, shown generally in FIG. 9, a block diagram is illustrated of the control system and computational means for providing control of the robotic frame while minimizing interaction force applied by the operator of the robotic frame to the robotic frame itself. The measured input parameters used by the computational means can include:

1. The robot joints angle vector, $\theta$ 200;
2. The robot joints velocity vector, $\dot{\theta}$ 210;
3. The measured joints torque vector, $\tau$ 220;
4. The gravity vector, g 230 (typically measured in some frame of reference attached to the exoskeleton, for example using an inertial measurement unit attached to the pelvis);
5. Force and moments, referred to as the F-vectors 240, resulting from interaction between the operator and the exoskeleton. The interaction force and moments vectors F are measured for example at locations, such as:
    (i) between the feet of the operator and exoskeleton, between a pelvic harness attached to the operator,
    (ii) between the pelvis of exoskeleton and the pelvic harness attached to the operator;
    (iii) between the exoskeleton spine structure and the shoulder harness attached to the operator;
    (iv) between the hands and/or wrists of the operator and the exoskeleton arms, and
    (v) Other locations are also possible.

In one embodiment, for the foot sensor-based control, the control law including gravity compensation is used to compute desired torque commands ($\tau_d$ 220) that produce the desired results. More specifically, the desired result is to achieve natural, intuitive control while keeping the interaction force between the operator and the exoskeleton many times less than the weight of the payload being transported by the system (except for the component of the weight of the operator itself that must be supported by his feet while standing on the ground). In one aspect, one such control law suitable for feet sensor-based control can be written as follows:

$$\tau_d = \hat{g}(\theta) + K_S(S_L, S_R) J^T K_f(S_L, S_R)(F_{filtered} - S_L \cdot m_p g_{foot}) \quad (1)$$

for the left leg and, $$\tau_d = \hat{g}(\theta) + K_S(S_L, S_R) J^T K_f(S_L, S_R)(F_{filtered} - S_R \cdot m_p g_{foot}) \quad (2)$$

for the right leg.

Functions and symbols used in the above expression are defined in the following paragraphs.

Referring to equations 1 and 2 above and shown generally in FIG. 9, $j^T$ 260 is the transposed Jacobian matrix which is a function of the exoskeleton joint angles θ 200 with the Jacobian itself relating the translational and angular velocity of some system of reference (e.g., the foot force-moment sensor) relative to another system of reference (e.g. a system of reference attached to the pelvis) and the exoskeleton joints speed $\dot{\theta}$ 210.

The term g(θ) 280 corresponds to the gravity compensation torque command. This gravity compensation command is a feed-forward command that provides steady-state weight compensation and allows the payload and the exoskeleton to be supported without using the Force-Moment sensor-based port of the control loop. It can also be used to implement automatic in-field verification of joint torque sensor calibration gain and zero-offset. The gravity compensation torque command g(θ) 280 depends on the overall exoskeleton and payload configuration in the presence of gravity, and the mass properties of the links and payload, interaction forces and moments between the exoskeleton and the ground, as well as the force-moment interactions between the operator and the exoskeleton.

$F_{filtered}$ 290 is a low-pass filtered force and moment vector measured by the right or left foot force-moment sensor, and is used as an input parameter for the control system. In practice, in order to increase the responsiveness of the system, and at the same time to maintain system stability, some non-linear, dynamically adjusted low-pass filter parameters are used. Many different implementations of this concept are possible.

The term $m_p g_{foot}$ 270, is a quantity that is close to the weight of the operator in the right or left foot force-moment sensor frame of reference. In the case of arms, pelvis, or back-mounted load cells, this value is generally set to zero or another desired targeted force-moment (e.g., a value that may result in a forward push exerted by the exoskeleton on the person).

The parameters referred to as $S_L$ 300 and $S_R$ 310 are scaling factors that are used to compute the desired force between the exoskeleton and the operator that must be used by the computational means. Several different functions may be used for this purpose and a few examples used to control exoskeleton are described below.

The left foot and right foot weight distribution factors, $S_L$ 300 and $S_R$ 310, respectively, are computed using the foot sensors to provide a metric for scaling joint torques, depending on which foot is on the ground or, if both feet are on the ground, the relative weighting of each foot. The simple calculation described below consists of taking the respective signed foot sensor reading (positive means a force pushing in the direction of gravity) and dividing it by the sum of both left and right signed foot sensor readings. If the value goes negative (such as when lifting the foot faster than the machine can respond), then it is set equal to zero. If the value becomes greater than positive one, then it is set equal to one. For example, when $S_L$ equals 1 and $S_R$ equals zero, the person is standing on his left foot and the right foot is raised. When $S_R$=0.5 and $S_L$=0.5, the person is equally weighting both feet. $S_R$ plus $S_L$ doesn't always equal exactly one (remember, both the numerator and denominator in this calculation use signed values) and other formulations are possible, but the relative (always positive) magnitudes do provide a useful means to scale the joint torques for controlling actions.

A number of functions having the characteristics described above may be used to the compute scaling factors: $S_L$ and $S_R$. In the particular case where the exoskeleton system is operated on an approximately horizontal surface, the component of the force along the x-axis measured in the sensor frame of reference corresponds with the orientation of the gravity vector in the foot frame of reference.

The following algorithm, shown below as equation 3, can been used to compute the scaling factors:

$$S_L = \begin{cases} 0 & \text{if } F_{x,L} < 0 \\ \dfrac{F_{x,L}}{F_{x,L} + F_{x,R}} & \text{if } \dfrac{F_{x,L}}{F_{x,L} + F_{x,R}} \leq 1 \\ 1 & \text{if } \dfrac{F_{x,L}}{F_{x,L} + F_{x,R}} > 1 \end{cases} \text{ and} \quad (3)$$

$$S_R = \begin{cases} 0 & \text{if } F_{x,R} < 0 \\ \dfrac{F_{x,R}}{F_{x,L} + F_{x,R}} & \text{if } \dfrac{F_{x,R}}{F_{x,L} + F_{x,R}} \leq 1 \\ 1 & \text{if } \dfrac{F_{x,R}}{F_{x,L} + F_{x,R}} > 1 \end{cases}$$

In the legs of the exoskeleton, as well as the full-body exoskeleton system, the scaling factor for the desired component of the force sensed by the force moment sensors can be estimated using the signed value of the component of the force measured by the right and left foot sensors along the gravity vector measured in the frame of reference of the foot sensors.

$$\hat{g}_L = g_L / \|g_L\| \quad (4)$$

$$\hat{g}_R = g_R / \|g_R\| \quad (5)$$

For this purpose, the unit gravity vector, $\hat{g}_{imu} = g_{imu} / \|g_{imu}\|$, is the inertial measurement unit (IMU) coordinate system expressed in the foot sensor frame of reference using the rotation matrices evaluated. This vector depends on the robot kinematics chain and robot joint angles. The gravity vector computation is shown above for the left and right legs in equations 4 and 5, respectively.

The force component used to calculate the scaling factors $S_L$ and $S_R$ can be obtained in a way similar to that described by the set of equations defined above, but where scalar $F_{x,L}$ and $F_{x,R}$ are replaced by, $F_{PE,L}{}^T \hat{g}_L$ and $F_{PE,R}{}^T \hat{g}_R$, respectively, where $F_{PE,L}$ and $F_{PE,R}$ are the three components of the force between the person and the exoskeleton in the left and right foot sensor frame of reference respectively. The same result can be obtained if we expressed the gravity vector in the pelvis frame of reference and also expressed the interaction force in the pelvis frame of reference.

Two series of feedback gain matrices can be used in the embodiment described in this disclosure. These are the sense K, $K_S$ 320 and the Force-Moment feedback gain matrix $K_F$ 330. In one embodiment, the sense-K and the Force-Moment feedback matrices are diagonal. Furthermore, the elements of the diagonal of $K_S$ 320 are equal to zero or are substantially equal in value. The characteristics of the sense-K feedback gain matrix basically allow the control system to be activated or turned off (e.g., when the element is zero) and a global gain scalar value to be applied. In another aspect, the Force-Moment gain matrix is diagonal. However, all elements of the diagonal may have significantly different values.

In another embodiment of the present invention, in order to optimize device stability and power, a sliding gains scheme may be implemented. High gains are desired for effortless mobility and object manipulation, used for non-load bearing portions of the system. However, high gains result in poor power. Low gains are desired to prevent instability under heavy payloads, used for the load bearing portions of the system. Low gains, however result in decreased mobility and velocity. By sliding the gains between load-bearing and non load-bearing portions of the system during operation, the device optimizes power and mobility. In order to improve the system performance during the single-leg or two-leg support part of the walk cycle, as well as during the swing phase of the cycle, a sliding-gain algorithm can be implemented to compute the control gains, as follows:

$$K_j(s_i) = K_{LOW} + (K_{HIGH} - K_{LOW}) f(s_i) \quad (5)$$

where j=F or S, refers to the Force-Moment(F) gains, "sense-K"(S), and i=R or L (the right or left leg), and where $K_{HIGH}$, $K_{LOW}$ are the high and low limiting values for the gains. The function f(s) varies monotonically from 1 to 0 as s (i.e. the scaling factor $S_L$ or $S_R$ defined earlier) varies from 0 to 1. One example of such a sliding gain algorithm is illustrated in FIG. 7 and shown below as equation 6.

$$\text{SlideGain} = K_{HIGH} + S_L^* (K_{LOW} - K_{HIGH})/(\text{thresh} + \epsilon) \quad (6)$$

The slidegain for the left leg is shown above in equation 6. However, a similar expression ($S_L$ replaced by $S_R$) may be used for the right leg. Thresh is a value beyond which the gain is constant, and $\epsilon$ can be a small number of the order of $10^{-3}$ to $10^{-6}$.

One example whereby the sliding gains scheme can be implemented includes sensing a change in the controlling interface force status relationship wherein displacement of the robotic device is desired. Thereafter, the system locks a non-moving load bearing portion of the exoskeleton and unlocks a moving non load bearing portion of the exoskeleton. Subsequently, the control system computes a joint rotational force of the unlocked non load-bearing portion of the exoskeleton required to restore the previously sensed controlling interface force status relationship including gravitational forces. The system also computes a joint rotational force of the locked load-bearing portion of the exoskeleton required to ensure the exoskeleton force on the human body is zero. The control system generates and transmits a signal to the actuator component of the device and displaces the unlocked non load-bearing portion of the exoskeleton at the computed joint rotational forces. It also actuates the displacement device coupled to the exoskeleton to maintain the computed joint rotational force in the locked load-bearing portion of the exoskeleton. The degree to which the joints of the exoskeleton are locked or unlocked is a function of the calculated gains discussed above.

Referring further to FIG. 9, the final calculated torque $\tau_d$ 220 is utilized to calculate the desired robotic joint velocity $\dot{\theta}_d$ 340 and desire joint position $\theta_d$ 350 relative to the calculated velocity gain $K_v$ 360 and position gain $K_p$ 370. Said values are then transmitted to the central control unit 160 of the robotic system 100 and implemented in order to maintain a controlling interface force status relationship between the sensors and the extremities of the human body.

In addition to the previous applications, the present invention can be used in any number of applications that require strength, stamina, and precision enhancement without tethering the operator to a stationary power or control source.

A method for enabling a wearable human exoskeleton to move in concert with movement of the human body is contemplated and disclosed herein. The method comprises the steps of donning a human exoskeleton and sensing a force status between a plurality of force sensors coupled to the exoskeleton and a contact location near the extremities of the human body. Additionally, the method comprises computing a direction of gravity relative to a portion of the exoskeleton and manually adjusting an exoskeleton human-force response value. Further, the method comprises displacing a portion of the human body relative to the force sensors and sensing a change in the force status. The method also comprises locking a non-moving load bearing portion of the exoskeleton, unlocking a moving non load bearing portion of the exoskeleton, computing a joint rotational force of the unlocked non load-bearing portion of the exoskeleton required to restore the force status including gravitational forces, computing a joint rotational force of the locked load-bearing portion of the exoskeleton required to ensure the exoskeleton force on the human body is zero, and generating a signal comprised of at least the calculated joint rotational forces. Additionally, the method comprises transmitting said signal to an actuator system coupled to said exoskeleton and actuating a displacement device coupled to the exoskeleton in response to said signal to displace the unlocked non load bearing portion of the exoskeleton at the computed joint rotational forces. Furthermore, the method comprises actuating the displacement device coupled to the exoskeleton in response to said signal to maintain the computed joint rotational force in the locked load-bearing portion of the exoskeleton and repeating the above steps to mimic movement of the human body.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A robot displacement device for use with a robotic frame shaped to approximate and be coupleable to at least a portion of a human body and configured to mimic movement of the human body, the robot displacement device comprising:
a force sensor attached to the robotic frame at or near a location associated with an extremity of the human body configured to sense a force between the robotic frame and the extremity of the human body, and output a force signal;
a central control unit attached to the robotic frame configured to receive the force signal from the sensor, detect a joint position of the robotic frame, compute a force of gravity and a direction of gravity relative to the position of the robotic frame, and calculate a force of the robotic frame exerted on the human body and a joint rotational force required to counteract the calculated force exerted on the human body by the robotic frame and maintain a controlling interface force status relationship between the robotic frame and the extremity of the human body, implement a sliding gains scheme between load-bearing and non load-bearing portions of the robotic displacement device during operation to optimize power and mobility, and generate and transmit an actuation signal, wherein the sliding gains scheme automatically incorporates a dynamically variable scaling factor based on the force of the robotic frame exerted on the human body to calculate the joint rotational force required to counteract the calculated force exerted on the human body by the robotic frame; and a drive system attached to the robotic frame configured to receive the transmitted actuation signal on an ongoing basis from the central control unit and exert the calculated joint rotational force on a joint component of the robotic frame to counteract the force exerted on the human body by the robotic frame in order to maintain the controlling force status relationship, wherein sliding gains are determined as follows:

$$K_j(s_i) = K_{LOW} + (K_{HIGH} - K_{LOW}) f(s_i)$$

where j is a Force-Moment gain or a sense gain, i is a right side or a left side, $K_{HIGH}$ is a high gain limiting value, $K_{LOW}$ is a low gain limiting value, and f(s) is a function that varies monotonically from 1 to 0 as s varies from 0 to 1, where s is a scale factor for the right side or the left side.

2. The robot displacement device of claim 1, wherein the force sensor is disposed in a non-contacting positional relationship near a contact location associated with the extremity of the human body.

3. The robot displacement device of claim 1, wherein the force sensor is disposed in a forcefully-contacting positional relationship with a location associated with a bottom portion of a foot of the human body.

4. The robot displacement device of claim 1, wherein the force sensor is positioned on the robotic frame at or near a location associated with a hip or a shoulder of the human body, the force sensor being capable of concurrently sensing multiple directions of movement of the human body upon multiple axes.

5. The robot displacement device of claim 1, wherein the drive system further includes multiple drive mechanisms positioned at multiple locations on the robotic frame capable of concurrent operation to displace the robotic frame in multiple directions and upon multiple axes.

6. The robot displacement device of claim 1, wherein the force sensor is activatable by non-human contact.

7. The robot displacement device of claim 1, wherein said drive system is powered by an internal combustion (IC) engine comprising:

a chamber having a piston, at least one fluid port coupled to said chamber for supplying fluid thereto and an out-take port, said piston and said at least one fluid port configured to provide a variable pressure to said chamber, said piston and said fluid configured to at least partially facilitate combustion to provide energy from said combustion in a combustion portion of said chamber;

a controller for controlling said combustion in said chamber; and a rapid response component in fluid communication with said chamber, said rapid response component situated adjacent said combustion portion of said chamber, said rapid response component configured to draw a portion of said energy from said combustion in said chamber.

8. The robot displacement device of claim 1, wherein the force sensor comprises a plurality of force sensors attached to the robotic frame along the approximate shape of the extremities of the human body, and wherein the central control unit is configured to direct power to at least one of the plurality of force sensors.

9. The robot displacement device of claim 1, wherein the central control unit is configured to receive remote signals from a communication device.

* * * * *